May 12, 1925. 1,537,085
F. INGEMARSON
FLUID PRESSURE TRANSMISSION AND CLUTCH
Filed May 29, 1924 3 Sheets-Sheet 2

Inventor
F. Ingemarson
By Clarence A. O'Brien
Attorney

May 12, 1925. 1,537,085
F. INGEMARSON
FLUID PRESSURE TRANSMISSION AND CLUTCH
Filed May 29, 1924 3 Sheets-Sheet 3
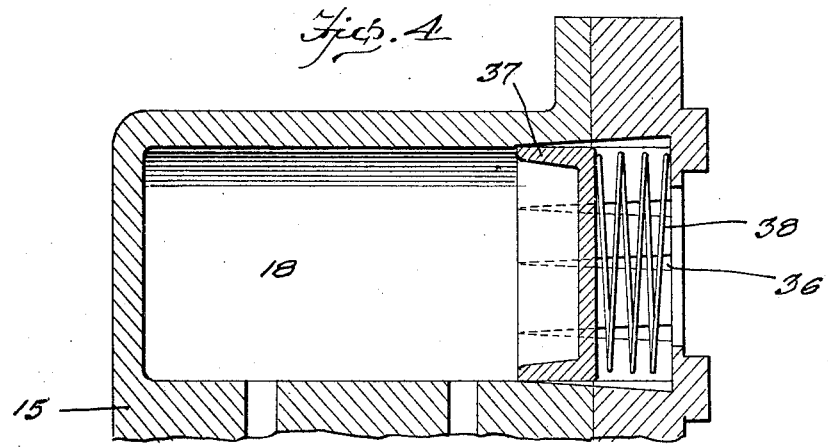
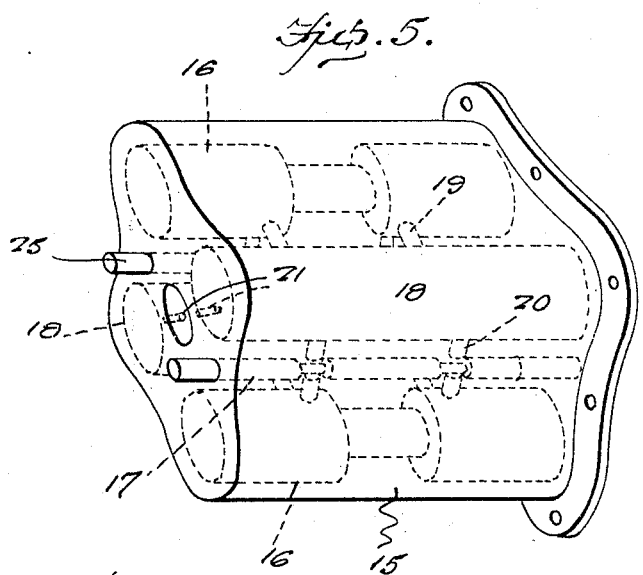
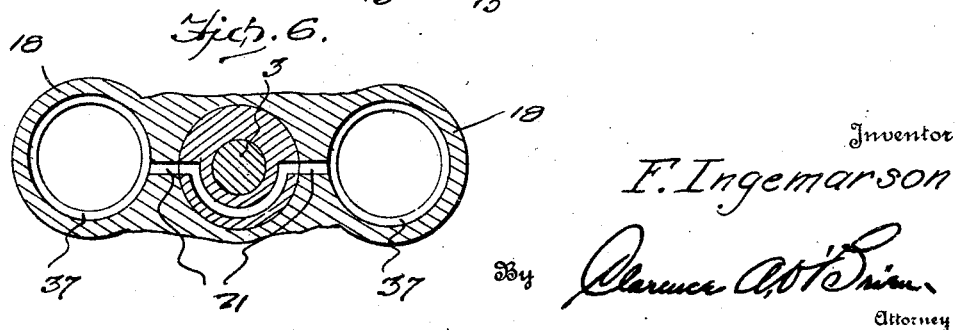
Inventor
F. Ingemarson
By Clarence A. O'Brien
Attorney Patented May 12, 1925.

1,537,085

UNITED STATES PATENT OFFICE.

FRANC INGEMARSON, OF TULSA, OKLAHOMA.

FLUID-PRESSURE TRANSMISSION AND CLUTCH.

Application filed May 29, 1924. Serial No. 716,714.

*To all whom it may concern:*

Be it known that I, FRANC INGEMARSON, a citizen of the United States, residing at Tulsa, in the county of Tulsa and State of Oklahoma, have invented certain new and useful Improvements in a Fluid-Pressure Transmission and Clutch, of which the following is a specification.

This invention relates to combined fluid pressure transmission and clutch devices and it consists in the novel features hereinafter described and claimed.

An object of the invention is to provide a clutch mechanism which is especially adapted to be used upon automobile machines for connecting the engine driving shaft with a driven shaft with means adapted to use columns of oil as the agent for inter-connecting the shafts whereby the shafts may be caused to rotate in the same direction and at the same rate of speed or at different rates, or the driven shaft may be rotated in a direction opposite to that in which the engine shaft is rotated and at the same rate of speed or at a different rate of speed.

With this object in view the structure includes a casing which receives the adjacent and aligned ends of the driving and driven shafts. A yoke is housed within the casing and is journaled on the driving shaft. A pair of pumps is housed within the casing and supported upon the bottom thereof, worm and worm wheel mechanisms being provided for operatively connecting the pumps with the yoke member. A block is housed within the casing and fixed to the yoke and the driven shaft is journaled in said block. The block is provided with a pair of piston cylinders and a pair of valve cylinders, the said cylinders being spaced at regular intervals apart and with their centers at equal distances from the center of the block. Pistons are slidably mounted in the piston cylinders and operatively connected with the yoke and the mechanisms carried by the yoke. Valves are slidably mounted in the valve cylinders and are arranged to control the passageway through ducts provided in the cylinder and which lead to reservoir chambers also provided in the block. Manually operable means are provided for shifting the valves in the block. Oil conduits lead from the pumps to the reservoir chambers in the block and a valve is provided for controlling the passageway through the said conduits and the last mentioned valve is operatively connecting with the means for shifting the valve which is located in the case.

In the accompanying drawings:

Figure 4 is a longitudinal sectional view through one of the pressure reserve compartments of the block.

Figure 5 is a perspective view of the block detached.

Figure 6 is a fragmentary detail transverse sectional view through an end portion of the block cut on the line 6—6 of Figure 1 of the drawing.

Figure 1:
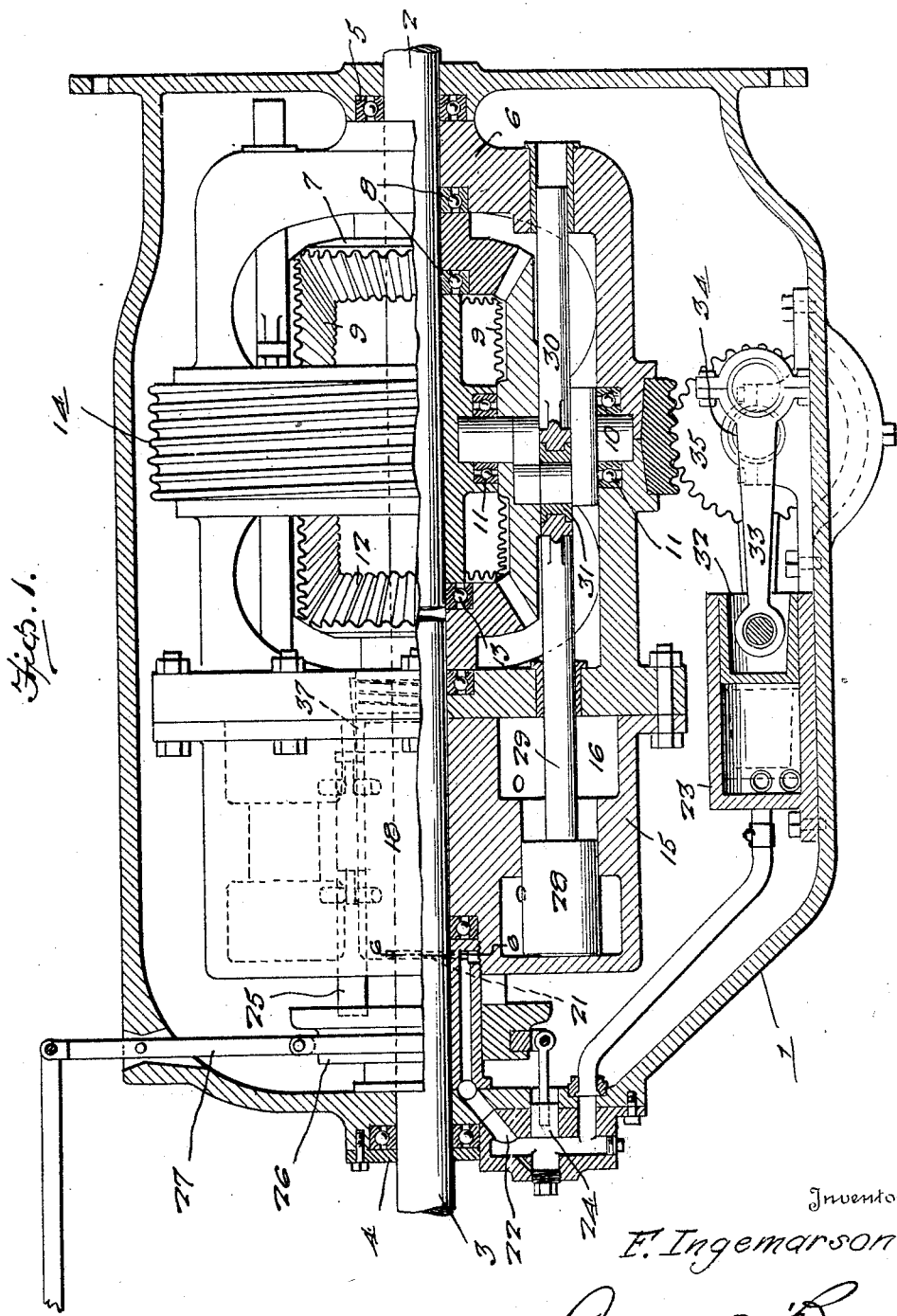
Figure 1 is a longitudinal sectional view through the casing of the fluid pressure transmission and clutch mechanism showing minor parts in side elevation and with some of the minor parts broken away and parts thereof shown in section.
Figure 2:
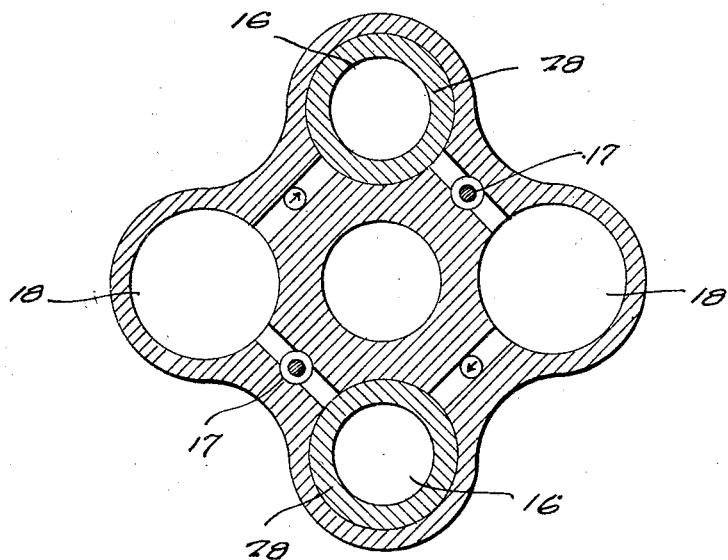
Figure 2 is a transverse sectional view through the block of the fluid pressure transmission and clutch mechanism.
Figure 3:
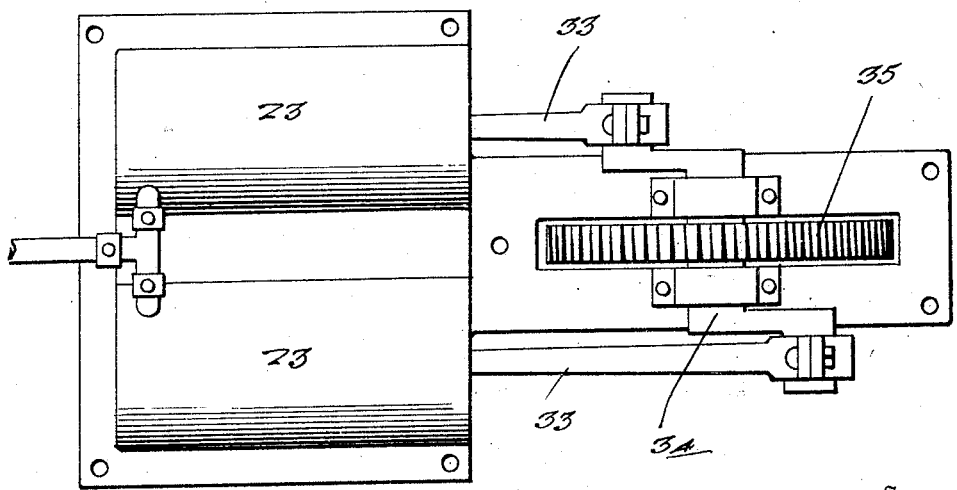
Figure 3 is a top plan view of the pump used in the said mechanism.

The combined fluid pressure transmission and clutch mechanism includes a casing 1 which is mounted upon shafts 2 and 3. The shaft 2 is the engine or driving shaft and the shaft 3 is the driven shaft. These shafts are aligned longitudinally with each other as shown in Figure 1 and their inner end portions are received within the casing 1. Suitable anti-friction bearings 4 and 5 are interposed between the walls of the casing 1 and the shafts 3 and 2 respectively.

A yoke 6 is housed within the casing 1 and is journaled on the driving shaft 2. A gear wheel 7 is journaled within the yoke and fixed upon the shaft 2. Anti-friction bearings 8 being provided for yoke and gear wheel. Gear wheels 9 are journaled within the yoke 6 and their teeth mesh with the teeth of the gear wheel 7 at the opposite side of the shaft 2. Crank shafts 10 are journaled in the yoke 6 and are located at the opposite sides of the shaft 2 and disposed transversely thereof. The shafts 10 are journaled in anti-friction bearings 11. The wheels 9 are fixed to the inner portions of the shafts 10. A gear wheel 12 is fixed to the driven shaft 3 and is located within the rear portion of the yoke 6. The rear end of the shaft 2 is journaled in the wheel 12 and upon anti-friction bearing 13. A worm thread 14 is provided at the exterior of the yoke 6 and surrounds the intermediate portion of the said yoke. A block 15 is fixed to the rear end of the yoke 6 and the shaft 3 is journaled in said block. The block 15 is provided with interiorly located piston chambers 16, valve chambers 17 and reservoir chambers 18. Ducts 19 provided with check valves connect the reservoir chambers 18 with the piston chambers 16, ducts 20 connect the reservoir chambers 18 with the valve chambers 17, ducts 21 connect with the reservoir chambers 18 and connect with a conduit 22 which leads to pump cylinders 23, a valve 24 being provided for controlling the passageway of the fluid through the conduit 22. Valves 25 are slidably mounted in the valve chambers of the block 15. A disc 26 is loosely mounted around the conduit member and is located at the rear of the block 15. The forward face of the disc 26 is fixed to the rear ends of the valves 25. A lever mechanism 27 is provided for moving the disc 26 and the valves 25. The valve 24 is operatively connected with the lever mechanism 27. Pistons 28 are slidably mounted in the chambers 16 and connect with piston rods 29 which are guided through the end portions of the yoke 6. The rods 29 are provided at points between their ends with cross heads 30 in which the blocks 31 are slidably mounted. The cranks of the shafts 10 are journaled in the blocks 31. Pistons 32 are slidably mounted in the cylinders of the pump 23. The said pistons are connected by rods 33 with the cranks of a shaft 34 which is journaled within the casing 1. A gear wheel 35 is mounted upon the shaft 34 and meshes with the worm thread 14.

The chambers 18 are provided at their side walls and at one end with longitudinally disposed grooves 36 and pistons 37 are arranged to slide over the said grooves. Springs 38 are interposed between the ends of the chambers and the adjacent sides of the pistons 37 and are under tension with a tendency to hold the piston beyond the inner end of the groove 36.

Assuming that the parts are in the position shown in Figure 1 of the drawings and the shaft 2 is rotated. The shaft carries with it the yoke 6 and the worm thread 14 rotates the worm wheel 35 whereby the pumps 23 are actuated and the fluid which is contained within the casing 1 is pumped through the conduit 22 into the reservoir chambers 18 of the block 15. From the reservoir chambers the fluid passes through the ducts 19 and 20 to the valves and the piston chambers. Thus the fluid is circulated through the block 15 and the pistons 28 may move freely back and forth in the chambers 16. The shaft 3 and the wheel 12 is at rest and the wheels 9 rotate upon their own axes and move around the periphery of the wheel 12. Thus the shaft 2 is rotated but the shaft 3 remains at its state of rest. When the disc 26 is moved toward the block 15 the valves 25 are moved to closed position in the chambers 17 and thus communication between the reservoir chambers and the piston chambers is interrupted. Therefore the fluid which is forced into the reservoir chambers moves the pistons 37 along the said chambers until the grooves 36 are uncovered and the fluid bleeds back into the casing 1. When the valves 25 are moved to closed position, the fluid is trapped in the chambers 16 at the opposite end of the piston 28 and consequently the said pistons cannot move longitudinally of the chambers and the rods 29 cease to reciprocate. However, they continue to turn with the yoke 6 and the wheel 12 and shaft 3 are rotated in the same direction as the shaft 2 is rotated.

When disc 26 is moved back from block 15 the valve 24 in conduit 22 is moved to closed position interrupts pistons 32 within pumps 23. When disc 26 is moved back valve 25 is provided with recess to cause no interruption with circulation of fluid in block 15. When valve 24 is moved to closed position, the fluid is trapped in pump 23 and consequently the pistons 32 cannot move and the rods 33 cease to reciprocate. However, gear 35 holds worm 14 and yoke 6, the gear wheel 12 begins to rotate in opposite direction from shaft 2.

Having thus described my invention, what I claim is:

1. A fluid pressure transmission and clutch device comprising aligned driving and driven shafts a yoke mounted upon the shafts, a gear fixed upon the driving shaft, angularly disposed gear wheels carried by the yoke, a gear wheel fixed upon the driven shaft and meshing with the gear wheels which are carried by the yoke, a block carried by the yoke and having chambers, pistons slidably mounted in the chambers of the block and connected with the gear wheels carried by the yoke, a pump for supplying fluid to the block chambers and means operatively connecting the pump with the yoke.

2. A combined fluid pressure transmission and clutch device comprising aligned driving and driven shafts a yoke mounted upon the shafts, a gear fixed to the driving shaft, gear wheels journaled upon the yoke, a gear wheel fixed to the driven shaft and meshing with the gear wheels carried by the yoke, a block carried by the yoke and provided with reservoir chambers and piston chambers, the block having ducts which connect the reservoir chambers with the piston chambers, pistons slidably mounted in the piston chambers and connected with the gear wheels carried by the yoke, valves for controlling the passage of fluid from the reservoir chambers to the piston chambers, means for shifting said valves, a pump having a conduit connected with the reservoir chambers in the block, a valve carried by the shifting means and adapted to control the passage way through said conduit and means operatively connecting the pump with the yoke.

3. A combined fluid pressure transmission and clutch device comprising aligned driving and driven shafts a yoke mounted upon the shafts, a gear fixed to the driving shaft, gear wheels journaled upon the yoke, a gear wheel fixed to the driven shaft and meshing with the gear wheels carried by the yoke, a block fixed to the yoke and having piston chambers and reservoir chambers and ducts connecting the reservoir chambers with the piston chambers, the reservoir chambers provided with valve and grooves to take care of excess fluid and overflow, valves for controlling the movement of the fluid through said ducts, means for shifting said valves, pistons mounted for movement in the piston chambers and operatively connected with the gear wheels carried by the yoke, pumps mounted below the yoke, a conduit connecting the pumps with the reservoir chambers of the block, a valve for controlling the movement of fluid through said conduit and operatively connected with said valve shifting means, and worm and worm wheel pump operating mechanism connected with the yoke.

In testimony whereof I affix my signature.

FRANC INGEMARSON.